(12) United States Patent
Kowaleski

(10) Patent No.: US 8,052,098 B1
(45) Date of Patent: Nov. 8, 2011

(54) CABLE, CORD, HOSE, AND ROPE HOLDING DEVICE

(76) Inventor: Kerry Keith Kowaleski, Vale, NC (US)

( * ) Notice: Subject to any disclaimer, the term of this patent is extended or adjusted under 35 U.S.C. 154(b) by 0 days.

(21) Appl. No.: 12/589,656

(22) Filed: Oct. 27, 2009

(51) Int. Cl.
*F16L 3/00* (2006.01)

(52) U.S. Cl. ............................ 248/49; 248/75; 248/237

(58) Field of Classification Search ............ 248/49, 248/75, 89, 51, 52, 80, 81, 82, 237; 254/395
See application file for complete search history.

(56) References Cited

U.S. PATENT DOCUMENTS

| | | | |
|---|---|---|---|
| 2,946,559 A | | 7/1960 | Pickett |
| 3,022,095 A | * | 2/1962 | Mazeika ..................... 285/45 |
| 4,132,372 A | | 1/1979 | Worrell |
| 4,869,773 A | | 9/1989 | Perkins |
| D309,561 S | | 7/1990 | Collins |
| 5,573,226 A | | 11/1996 | Smith |
| 5,788,204 A | * | 8/1998 | Goodwin et al. ........... 248/357 |
| 5,829,718 A | * | 11/1998 | Smith ............................ 248/55 |
| 6,095,462 A | | 8/2000 | Morgan |
| 6,332,595 B1 | * | 12/2001 | Klucznik ..................... 248/87 |
| 6,729,606 B1 | | 5/2004 | Durin |
| 7,069,698 B2 | | 7/2006 | Nee |
| 7,451,590 B2 | * | 11/2008 | Blase .......................... 59/78.1 |
| 7,527,227 B1 | * | 5/2009 | Mondello .................... 248/75 |
| 2001/0009087 A1 | * | 7/2001 | Valentz et al. .............. 52/298 |
| 2001/0028021 A1 | | 10/2001 | Martin |
| 2004/0232276 A1 | | 11/2004 | Ferris |

FOREIGN PATENT DOCUMENTS

| | | |
|---|---|---|
| DE | 3611985 | 10/1987 |
| DE | 10204734 | 8/2003 |
| JP | 2004324404 | 11/2008 |

* cited by examiner

*Primary Examiner* — Ramon Ramirez

(57) ABSTRACT

The present invention is a device that can be used to hold cables, cords, hoses, ropes, and similar objects that are used during work on a roof top. The cable holding device is comprised of a body for holding the cables, a mounting bracket for mounting the invention to a roof, and an arm that serves to extend the body beyond the terminal edge of a roof. The body and the mounting bracket are respectively attached to the arm by any conventional means. The mounting bracket cooperates with the arm to extend the body a suitable distance beyond the terminal edge of a roof top, allowing cables held within the body to drape over the edge of a building without touching the terminal edge of the roof.

6 Claims, 6 Drawing Sheets

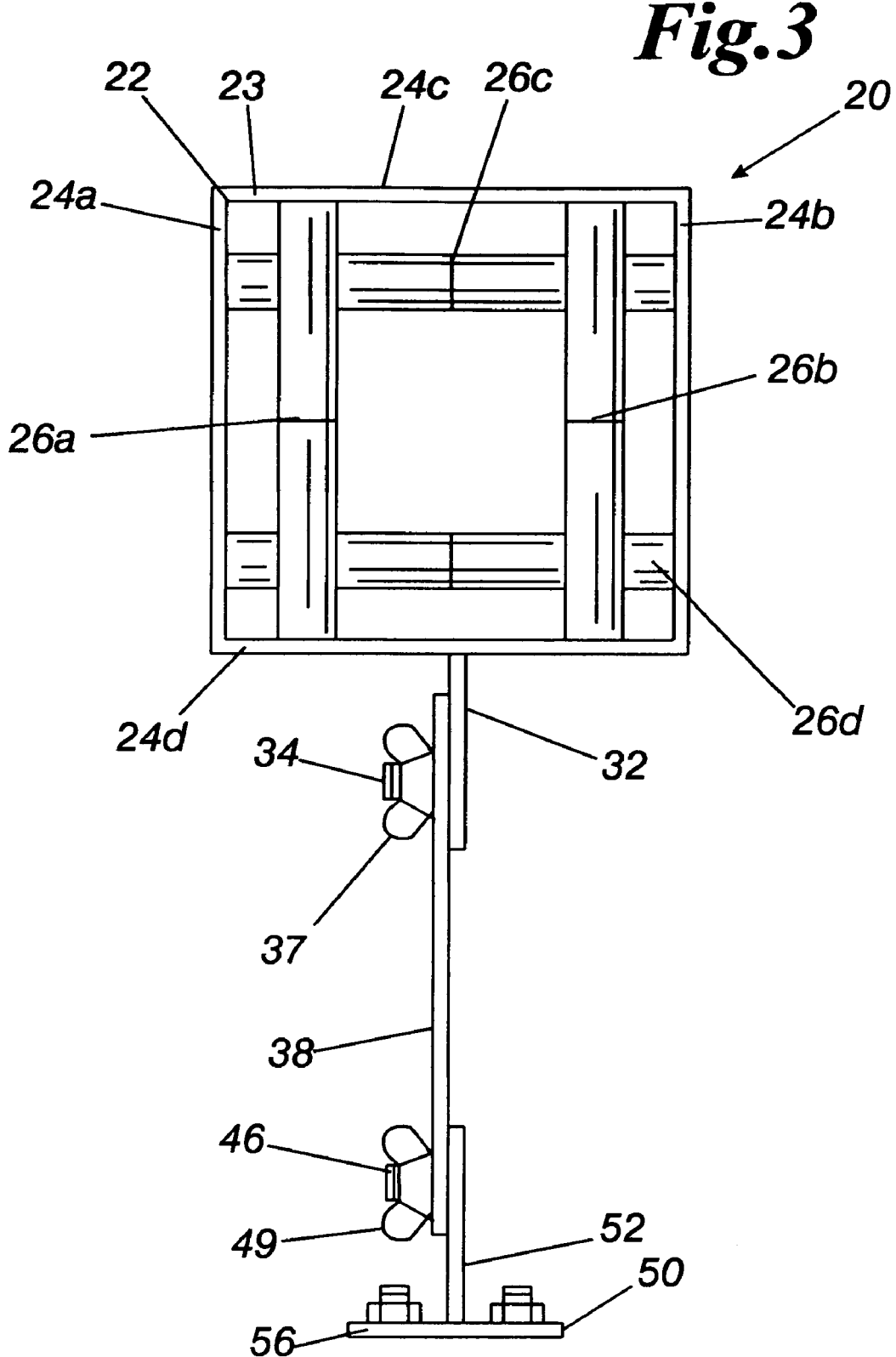

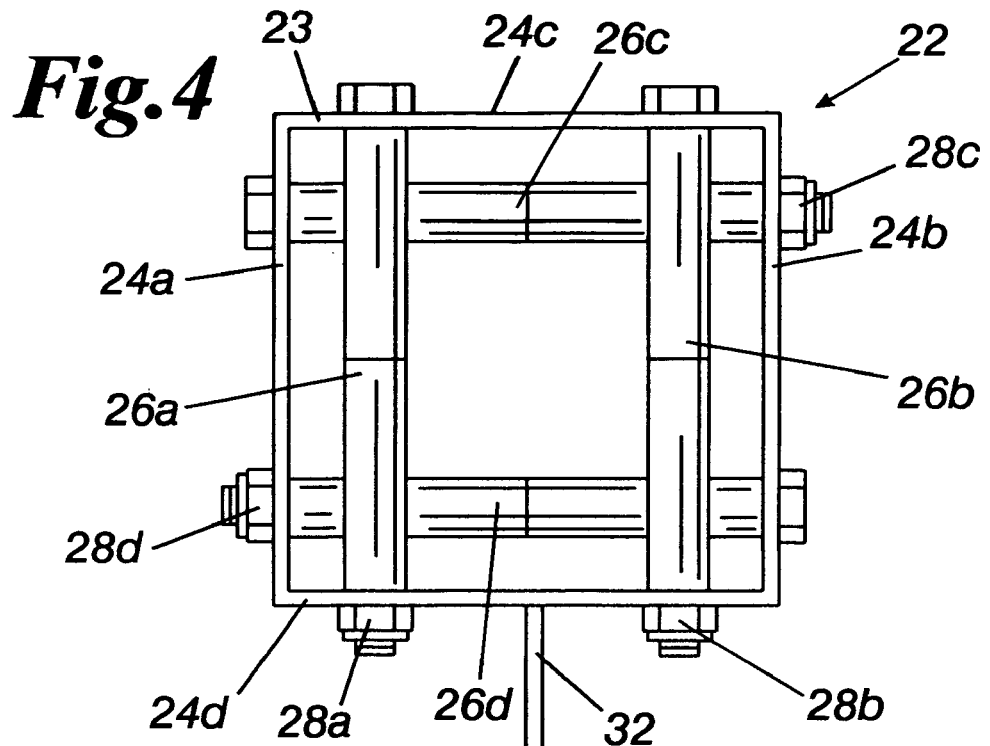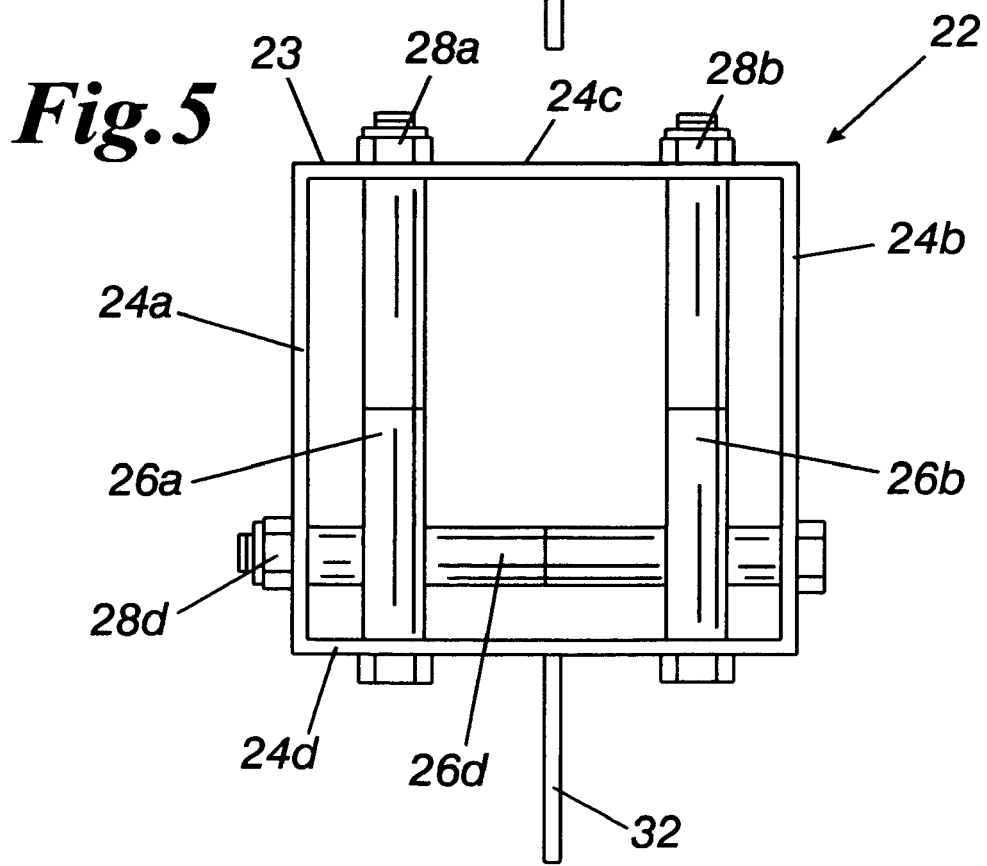

CABLE, CORD, HOSE, AND ROPE HOLDING DEVICE

BACKGROUND OF INVENTION

1. Field of Invention

This invention relates to a device that can be utilized to hold cables, cords, hoses, and ropes when work is performed on roof tops. The invention prevents cables, cords, hoses, ropes, and similar objects from getting caught on the edge of a roof, eave of a roof, stud wall, concrete wall, or similar structure.

2. Description of Prior Art

Cables, cords, hoses, and ropes may be required during work on a roof top. While the work is being performed, cords from electrical equipment are often left hanging over the side of a roof top to allow the free ends to be plugged into electrical sockets at ground level. Hoses are also often left hanging over the side of a roof top to connect to a water receptacle, air compressor, or other receptacle at ground level. Similarly, electric cables, fiber optic cables, and ropes may also hang over the side of a roof during roof top work.

One disadvantage of this previously known practice of allowing cables, cords, hoses, and ropes to hang over a roof is that the cable, cord, hose, or rope can become damaged. If fiber optic cables are damaged, this could lead to a decrease or total cessation of signals traveling through the cable. Damaged electrical cables and electrical cords can lead to loss of power supply to electrical equipment and can also lead to accidental electrocution due to exposed surfaces of the electrical cables and cords. Additionally, damaged water hoses can lead to water leakage on the roof, increasing the potential for slips and falls as well as increasing the possibility of accidental electrocution. Damaged air hoses can lead to loss of air pressure and wasted electricity. Damaged ropes could lead to the inability of the rope to provide stability to workers on the roof or to inability of the rope to serve as an effective harness mechanism. If workers inadvertently use a damaged rope to ascend or descend from the roof, the damaged rope could break and lead to serious injury or death. Cables, cords, hoses, and ropes that are left unsecured while hanging over a roof can also suffer damage or cause injury if blown around by strong wind gusts. Lastly, roof top workers could also trip and fall over cables, cords, hoses, and ropes that are not secured and this could pose a major safety hazard.

The literature is replete with various devices that hold cables, cords, hoses, and ropes. Patents discussing various cable, cord, hose, and rope holders include Morgan, U.S. Pat. No. 6,095,462, Nee, U.S. Pat. No. 7,069,698; Durin, U.S. Pat. No. 6,729,606; and Smith, U.S. Pat. No. 5,573,226. Publications discussing cable and rope holders include Lieneweber, DE Publication No. DE3611985 and Proepster, DE Publication No. DE10204734.

Although Morgan, U.S. Pat. No. 6,095,462, Nee, U.S. Pat. No. 7,069,698, Lieneweber, DE Publication No. DE3611985 and Proepster, DE Publication No. DE10204734 address the issue of holding cables, hoses, and ropes during work on roof tops, none of these prior art references provide a device for preventing damage to cables, cords, hoses, and ropes that hang over the terminal edge of a roof top, eave, stud wall, concrete wall, or similar structure What is desired is a device that can hold, secure, and prevent damage to cables, cords, hoses, and ropes that are draped over the terminal edge of a roof top, eave, stud wall, concrete wall, or a similar structure.

SUMMARY OF THE INVENTION

The present invention is a simple device that can be used to secure cables that hang over the side of a roof. As used herein, the term cable is to be broadly construed and is inclusive of cables, cords, hoses, ropes, wires, and similar items. This device is particularly useful when the roof top work requires cables to be attached to or plugged into receptacles at ground level. The device is also useful when cables are used to stabilize workers on a roof top or when ropes are used to provide a harness for workers.

The present invention is comprised of a body, a mounting bracket, and an arm having a first and a second end. The body and the mounting bracket are attached to the first and second ends of the arm respectively. The body holds the cables and the mounting bracket provides a means of attachment to a roof top, eave, stud wall, concrete wall, or similar structure. The arm serves to extend the body a suitable distance beyond the terminal edge of a roof allowing cables to drape over the edge of a building without touching the terminal edge of the roof.

The body comprises a framework, a plurality of rods that is attached to the framework by any conventional means and that rotates relative to the framework, and a plate that is connected to the framework. The plate has least one aperture that is used to connect the body to the arm. The framework carries the rods and forms a perimeter around the rods. Two or more rods are in parallel and are disposed in a first plane. At least one rod is disposed in a second plane that is not parallel to the first plane. The configuration of the rods allows for cables to be secured by at least one rod without interference from any of the other rods. The rods and the framework communicate to releasably secure the cable in a fixed position within the device. In particular, by weaving the cable through the rods, static friction maintains the cable in a fixed position within the body. However, the static friction may be overcome by manually pulling the cable and the cable can be pulled in any direction.

The arm comprises a first end and a second end. Each end of the arm has at least one aperture for attaching the arm to the body and for attaching the arm to the mounting bracket. The arm adds additional flexibility of use to the invention by allowing extension of the body beyond the terminal edge of a roof.

The mounting bracket comprises a riser portion that is connected to a mounting portion by any conventional means. The riser portion is disposed in a first plane and the mounting portion is disposed in a second plane. The first and second planes are offset from each other and are not in parallel. The riser portion has at least one aperture to allow for connection of the mounting bracket to the arm. The mounting portion has a plurality of apertures to allow for connection of the mounting bracket to a desired surface. The mounting bracket provides the means for attaching the present invention to a roof or similar structure and the mounting bracket cooperates with the arm to extend the body a suitable distance beyond the terminal edge of a roof. The mounting bracket also provides added flexibility and stability needed to sustain high winds.

BRIEF DESCRIPTION OF DRAWINGS

The foregoing and other objects will become more readily apparent by referring to the following detailed description and the appended drawings in which:

FIG. 3 is a perspective view of an alternative embodiment of the cable holding device of FIG. 1 having a body, an arm, and a mounting bracket.

FIG. 4 is a fragmented view of cable holding device of FIG. 1, showing in particular the preferred embodiment of the body, which is comprised of a framework, a plate, two or more rods that are in parallel and that are disposed in a first plane, and two or more rods that are in parallel and that are disposed in a second plane that is not parallel to the first plane.

FIG. 5 is a fragmented view of cable holding device of FIG. 1, showing an alternative embodiment of the body, which is comprised of a framework, a plate, two or more rods that are in parallel and that are disposed in a first plane, and at least one rod that is disposed in a second plane that is not parallel to the first plane.

DETAILED DESCRIPTION OF THE INVENTION

Figure 1:
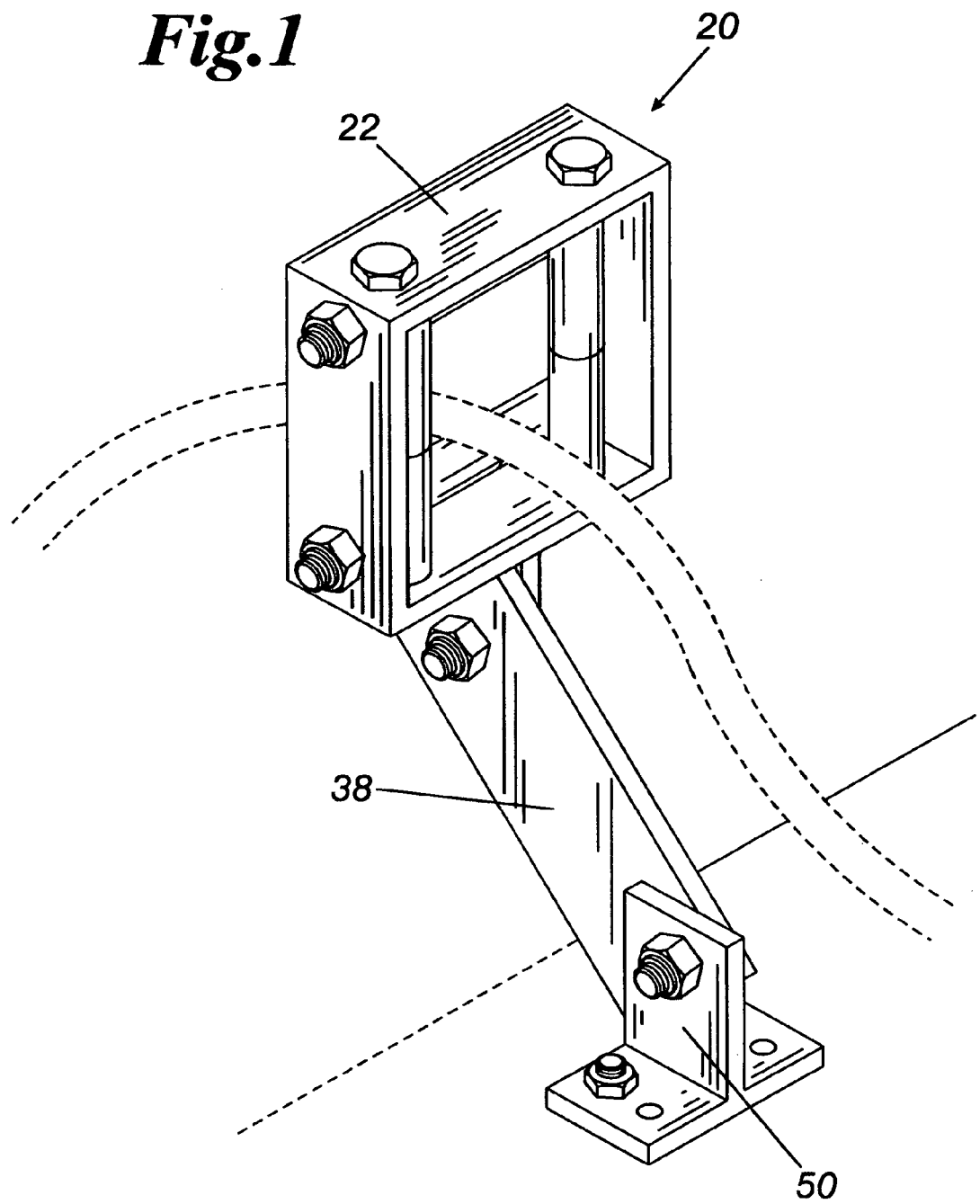
FIG. 1 is a perspective view of the cable holding device showing the device in position on a roof and holding at least one cable.

Referring now to the drawings and particularly to FIG. 1, the invention is a cable holding device 20 for holding cables when work is performed on roof tops. As used herein, the term cable is to be broadly construed and is inclusive of cables, cords, hoses, ropes, wires, and similar items. The present invention 20 holds cables and allows cables to drape over the edge of a building without touching the terminal edge of the roof.

The cable holding device 20 is comprised of a body 22 for holding the cables, a mounting bracket 50 for mounting the invention to a roof, and an arm 38 that serves to extend the body 22 beyond the terminal edge of a roof. The body 22 and the mounting bracket 50 are respectively attached to the arm 38 by any conventional means. The mounting bracket 50 cooperates with the arm 38 to extend the body 22 a suitable distance beyond the terminal edge of a roof top, allowing cables held within the body 22 to drape over the edge of a building without touching the terminal edge of the roof. The mounting bracket 50 also provides added flexibility and stability needed to sustain high winds.

Figure 2:
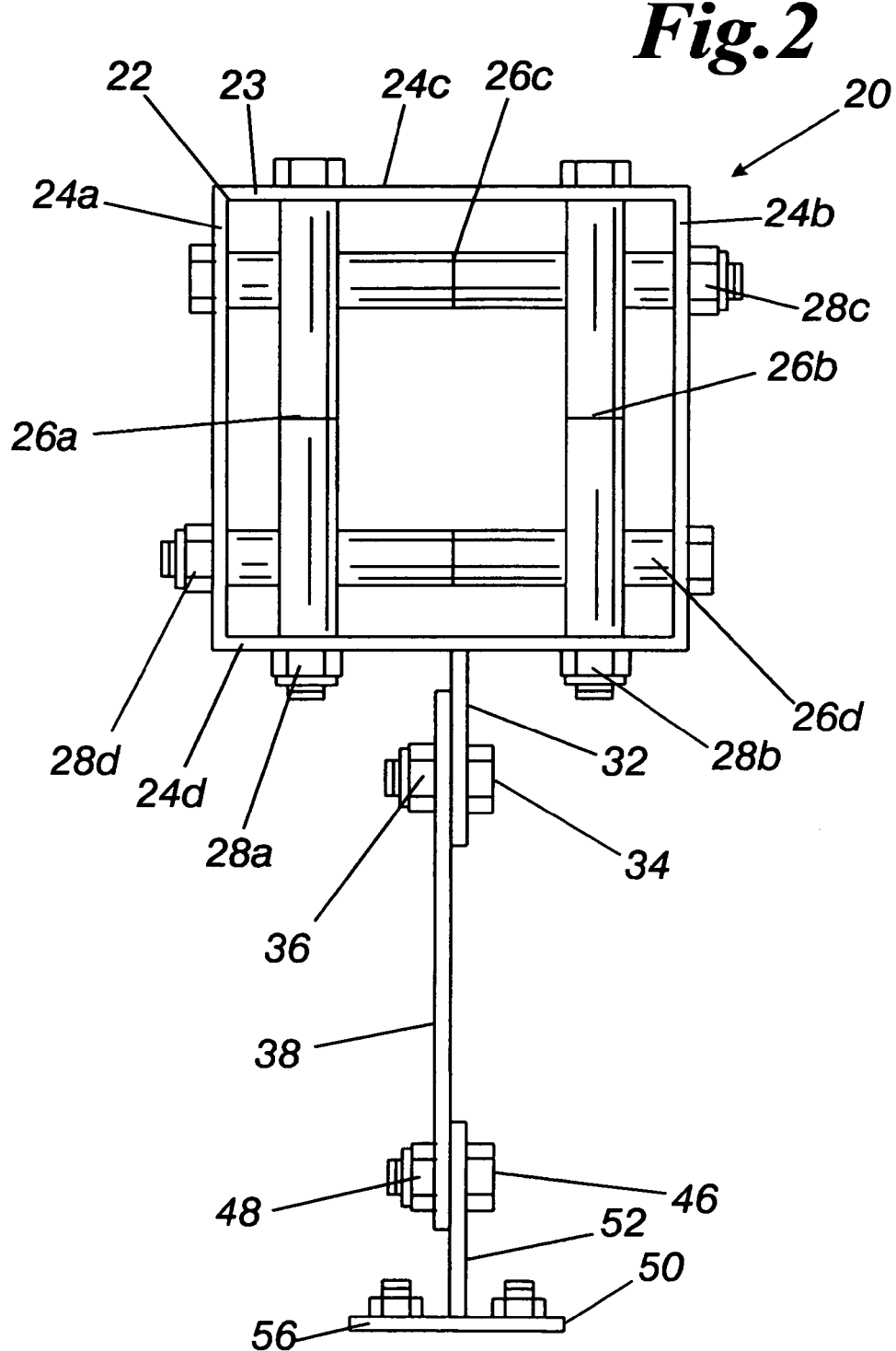
FIG. 2 is a perspective view of the cable holding device of FIG. 1 having a body, an arm, and a mounting bracket, in accordance with an exemplary embodiment of the present invention.

As shown in FIG. 2, the body 22 of the cable holding device 20 comprises a framework 23, a plurality of rods 26a, 26b, 26c, 26d, and a plate 32. The preferred embodiment of the body 22 has two or more rods 26a, 26b that are in parallel and that are disposed in a first plane. The preferred embodiment of the body 22 also has two or more rods 26c, 26d that are in parallel and that are disposed in a second plane that is not parallel to the first plane. The framework 23 carries the rods 26a, 26b, 26c, 26d and the framework 23 forms a perimeter around the rods 26a, 26b, 26c, and 26d. In an exemplary embodiment, the framework 23 is comprised of a plurality of structural plates 24a, 24b, 24c, 24d and has a generally rectangular configuration. The structural plates 24a, 24b, 24c, 24d have a plurality of apertures (not shown) through which the rods 26a, 26b, 26c, 26d pass. Apertures (not shown) of opposing structural plates 24c, 24d are in alignment to allow optimal positioning of the rods 26a, 26b in a first plane. Similarly, apertures (not shown) of opposing structural plates 24a, 24b are in alignment to allow optimal positioning of the rods 26c, 26d in a second plane that is not parallel to the first plane.

In an exemplary embodiment, the measurements for length, width, and thickness for the structural plates 24a, 24b, 24c, 24d of the framework 23 are four inches, one and three quarters of an inch, and one eighth of an inch respectively. The inside diameter of the apertures (not shown) of the structural plates 24a, 24b, 24c, 24d is at least one quarter of an inch in one embodiment. In an exemplary embodiment, the inside diameter of the framework 23 is four inches and the outside diameter of the framework 23 is four and a quarter inches. It is understood by those skilled in the art that these measurements are not to be construed as limits on the claims and variations will be in accordance to the particular application in which the invention is used Rods 26a, 26b, 26c, 26d have an enlarged head on one end to assist in positional integrity. The rod fastening lock nuts 28a, 28b secure one end of each of the rods 26a, 26b to the structural plates 24c, 24d of the framework 23. Similarly, the rod fastening lock nuts 28c, 28d secure one end of each of the rods 26c, 26d to the structural plates 24a, 24b of the framework 23. The other end of each of the rods 26a, 26b, 26c, 26d is secured to the framework 23 by the enlarged heads of the rods 26a, 26b, 26c, 26d. At least one of the structural plates 24a, 24b, 24c, 24d is connected to a plate 32 in an exemplary embodiment. The plate 32 has at least one aperture (not shown) that is used to connect the body 22 to the arm 38.

The rods 26a, 26b, 26c, 26d are rotatable and span the framework 23. The rods 26a, 26b, 26c, 26d are comprised of one or more pieces. Various methods can be provided to allow the rods 26a, 26b, 26c, 26d to rotate in relation to the framework 23. If the rods 26a, 26b, 26c, 26d are one piece, one such method of providing rotation involves utilizing a plurality of bearing mechanisms (not shown) in the structural plates 24a, 24b, 24c, 24d. The bearing mechanisms (not shown) are aligned with the apertures (not shown) of the structural plates 24a, 24b, 24c, 24d. Known suitable bearings, include, for example, sliding bearings and roller element bearings.

Figure 8:
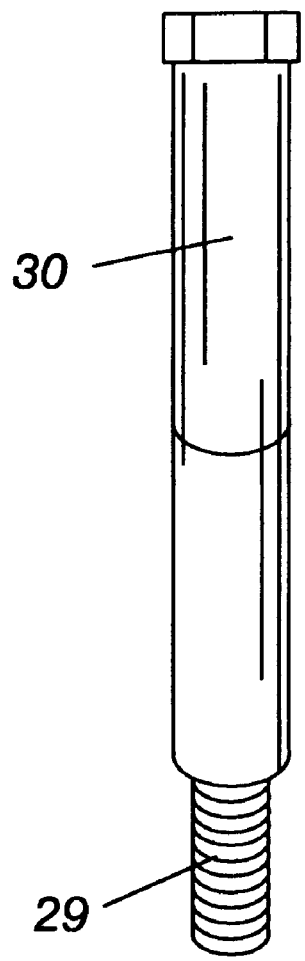
FIG. 8 is a perspective view of a multi-piece rod that is comprised of a fixed central member that is surrounded by an external casing.
Figure 9:
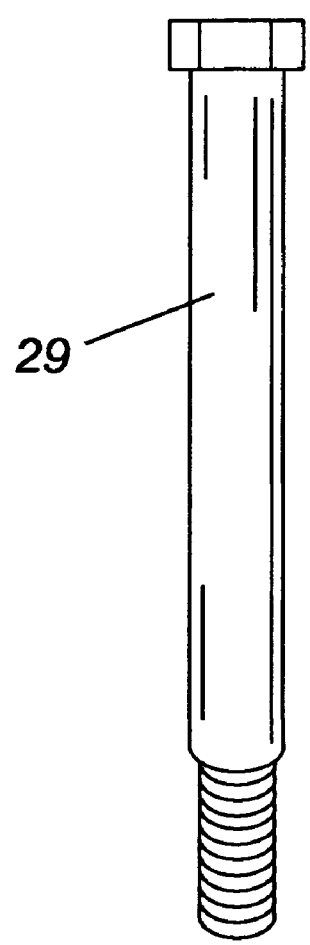
FIG. 9 is perspective view of the fixed central member of a rod.
Figure 10:
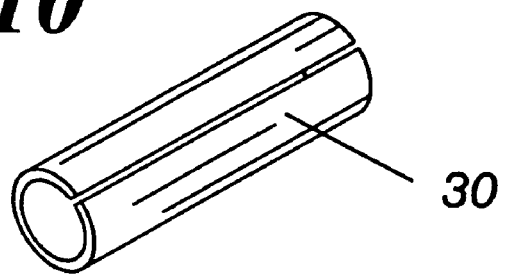
FIG. 10 is a perspective view of the external casing of a multi-piece rod.

The rods 26a, 26b, 26c, 26d can also be comprised of multiple pieces which, when combined, allow for rotation in relation to the framework 23. Multi-piece rods 26a, 26b, 26c, 26d have a fixed central member 29 (as shown in FIG. 8 & FIG. 9) and an external casing 30 (as shown in FIG. 8 & FIG. 10). The external casing 30 (as shown in FIG. 8 & FIG. 10) is concentrically positioned around the fixed central member 29 (as shown in FIG. 8 & FIG. 9) and rotates around the fixed central member 29 (as shown in FIG. 8 & FIG. 9).

The plate 32 is attached to at least one of the structural plates 24a, 24b, 24c, 24d of the framework 23 in an exemplary embodiment. The plate 32 has at least one aperture (not shown) that is used to connect the body 22 to the arm 38. The measurements for length, width, and thickness of the plate 32 in an exemplary embodiment are two and one half inches, one and three quarters of an inch, and one eighth of an inch respectively. Each aperture (not shown) of the plate 32 of the body 22 has an inside diameter of at least one fourth of an inch. As understood by those skilled in the art, these measurements are not to be construed as limits on the claims and variations will be in accordance to the particular application in which the invention is used.

Figure 6:
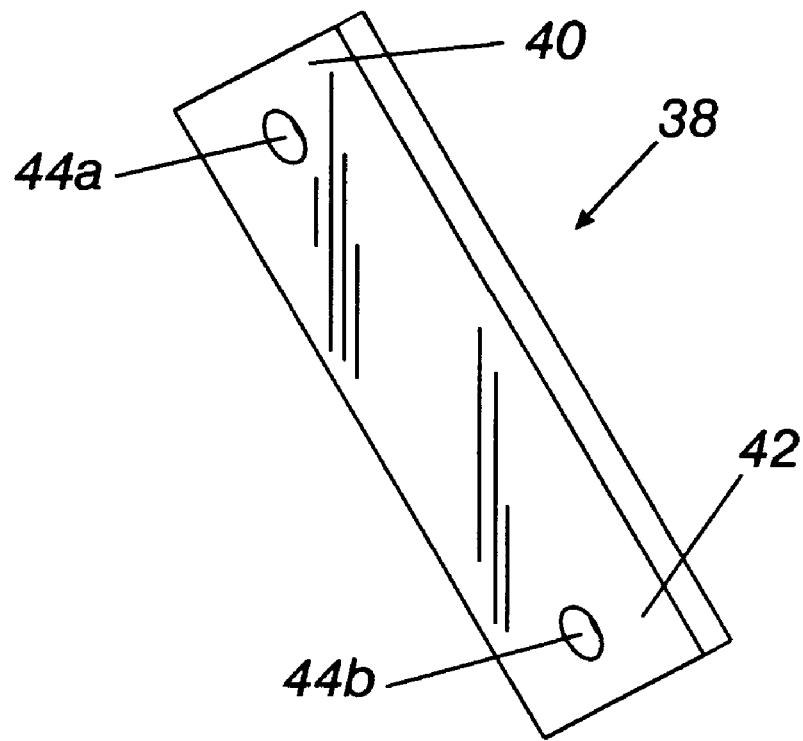
FIG. 6 is a fragmented view of the cable holding device of FIG. 1, showing in particular only the arm of the present invention.

In an exemplary embodiment of cable holding device 20 as shown in FIG. 2, the upper adjusting bolt 34 passes through at least one aperture 44a (as shown in FIG. 6) of the arm 38 (as shown in FIGS. 1-3 & FIG. 6) and through an aperture (not shown) of the plate 32 (as shown in FIGS. 2-5) of the body 22 (as shown in FIGS. 1-5). The upper adjusting lock nut 36 secures the upper adjusting bolt 34 and allows for a pivotal connection between the body 22 (as shown in FIGS. 1-5) and the arm 38 (as shown in FIGS. 1-3 and FIG. 6). The upper adjusting bolt 34 has a length of at least one and one half of an inch and an outside diameter of at least a quarter of an inch in an exemplary embodiment. It is understood by those skilled in the art that these measurements are not to be construed as limits on the claims and variations will be in accordance to the particular application in which the invention is used.

Figure 7:
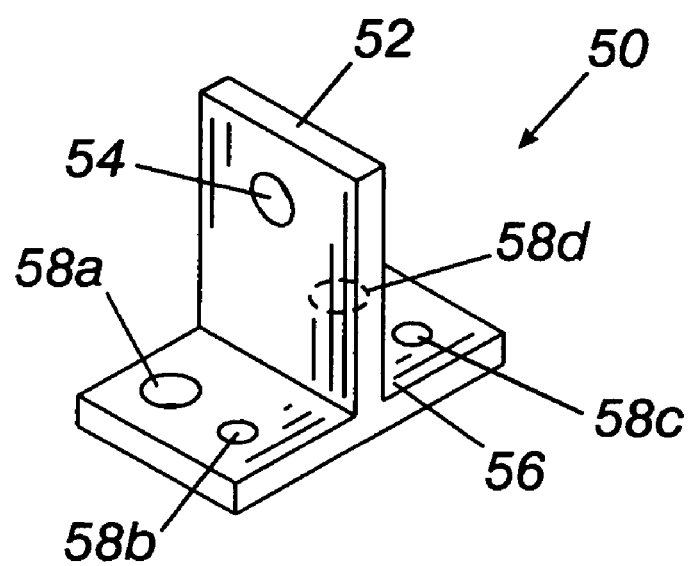
FIG. 7 is a fragmented view of the cable holding device of FIG. 1, showing in particular a side view of the mounting bracket of the present invention.

The lower adjusting bolt 46 passes through at least one aperture 44b (as shown in FIG. 6) of the arm 38 (as shown in FIGS. 1-3 and FIG. 6) and through at least one aperture 54 (as shown in FIG. 7) of the riser portion 52 (as shown in FIGS. 2-3 and FIG. 7) of the mounting bracket 50 (as shown in FIGS. 1-3 and FIG. 7). The lower adjusting lock nut 48 secures the lower adjusting bolt 46 and allows for the pivotal connection of the arm 38 and the mounting bracket 50 (as shown in FIGS. 1-3 and FIG. 7). The lower adjusting bolt 46 has a length of at least one and one half of an inch and an outside diameter of at least a quarter of an inch in an exemplary embodiment. It is understood by those skilled in the art that these measurements are not to be construed as limits on the claims and variations will be in accordance to the particular application in which the invention is used.

In an alternative embodiment of cable holding device 20 as shown in FIG. 3, the enlarged heads are removed from the rods 26a, 26b, 26c, 26d and the fixed central member 29 (as shown in FIG. 8 & FIG. 9) of each of the rods 26a, 26b, 26c, 26d is welded to the inside of the framework 23. External casing 30 (as shown in FIG. 8 & FIG. 10) is concentrically positioned around the fixed central member 29 (as shown in FIG. 8 & FIG. 9) and rotates around the fixed central member 29 (as shown in FIG. 8 & FIG. 9). In this embodiment of cable holding device 20, the enlarged head of the upper adjusting bolt 34 is removed and one surface of the upper adjusting bolt 34 is tack welded to the plate 32. The upper adjusting bolt 34 passes through at least one aperture 44a (as shown in FIG. 6) of arm 38 (as shown in FIGS. 1-3 & FIG. 6) and is secured to the arm 38 (as shown in FIGS. 1-3 & FIG. 6) by the upper adjusting wing nut 37. The upper adjusting bolt 34 has a length of at least one and one half of an inch and an outside diameter of at least a quarter of an inch in an exemplary embodiment. It is understood by those skilled in the art that these measurements are not to be construed as limits on the claims and variations will be in accordance to the particular application in which the invention is used.

Similarly, the enlarged head of the lower adjusting bolt 46 is removed and one surface of the lower adjusting bolt 46 is tack welded to the riser portion 52 of the mounting bracket 50. The lower adjusting bolt 46 passes through at least one aperture 44b (as shown in FIG. 6) of the arm 38 (as shown in FIGS. 1-3 and FIG. 6) and is secured by the lower adjusting wing nut 49 in this embodiment. The lower adjusting bolt 46 has a length of at least one and one half of an inch and an outside diameter of at least a quarter of an inch in an exemplary embodiment. As understood by those skilled in the art, these measurements are not to be construed as limits on the claims and variations will be in accordance to the particular application in which the invention is used.

FIG. 4 shows an exemplary embodiment of body 22. The body 22 comprises a framework 23, a plurality of rods 26a, 26b, 26c, 26d, and a plate 32. In the preferred embodiment, a two or more rods 26a, 26b are in parallel and are disposed in a first plane. Two or more rods 26c, 26d are in parallel and are disposed in a second plane that is not parallel to the first plane. The configuration of the rods 26a, 26b, 26c, 26d allows cables to be secured by at least one of the rods 26a, 26b, 26c, 26d without interference from any of the other rods 26a, 26b, 26c, or 26d. The rods 26a, 26b, 26c, 26d and the framework 23 communicate to releasably secure cables in a fixed position within the body 22. In particular, by weaving the cable through the rods 26a, 26b in the first plane and through the rods 26c, 26d in the second plane, static friction maintains the cable in a fixed position within the body 22. The static friction may be overcome by manually pulling the cable and the cable can be pulled in any direction.

As shown in FIG. 5, an alternative embodiment of the body 22 includes two or more rods 26a, 26b that are in parallel and that are disposed in a first plane. At least one rod 26c (not shown) or 26d is disposed in a second plane that is not parallel to the first plane. The configuration of the rods 26a, 26b in conjunction with the singular rod 26c (not shown) or 26d allows cables to be secured by at least one of the rods 26a, 26b, 26c (not shown), 26d without the interference of any of the other rods 26a, 26b, 26c (not shown), or 26d. The rods 26a, 26b and the singular rod 26c (not shown) or 26d communicate with the framework 23 to releasably secure cables in a fixed position within the body 22. In particular, by weaving the cable over the rods 26a, 26b or over the singular rod 26c (not shown) or 26d, static friction maintains the cable in a fixed position within the body 22. The static friction may be overcome by manually pulling the cable and the cable can be pulled in any direction.

As shown in FIG. 6, the arm 38 is comprised a first end 40 and a second end 42. The first end 40 of the arm 38 has at least one aperture 44a that is used connect the arm 38 to the body 22 (as shown in FIGS. 1-5). The second end 42 of the arm 38 has at least one aperture 44b that is used to connect the arm 38 to the mounting bracket 50 (as shown in FIGS. 1-3 and FIG. 7). In an exemplary embodiment, the arm 38 has a length, width, and thickness of six inches, two inches, and one eighth of an inch, respectively. Each of the apertures 44a, 44b of the arm 38 has an inside diameter of at least a quarter of an inch in this embodiment. As understood by those skilled in the art, these measurements are not to be construed as limits on the claims and variations will be in accordance to the particular application in which the invention is used.

As shown in FIG. 7, the mounting bracket 50 is comprised of a riser portion 52 that is connected to a mounting portion 56 by any conventional means as discussed later in the application. The riser portion 52 is disposed in a first plane and the mounting portion 56 is disposed in a second plane. The first and second planes are not parallel and are offset from each other. The riser portion 52 has at least one aperture 54 that is used to pivotally join the mounting bracket 50 to the arm 38 (as shown in FIGS. 1-3 and FIG. 6). The mounting portion 56 has a plurality of apertures 58a, 58b, 58c, 58d that are used to fasten the mounting bracket 50 to a desired surface. Fastening devices, such as mounting bolts and self tapping screws pass thru apertures 58a, 58b, 58c, 58d, allowing for attachment of the cable holding device 20 to a desired surface. In an alternate embodiment, the mounting portion 56 may be magnetic for magnetic attachment to metal that is secured to a roof. In another embodiment, the mounting portion 56 may attached to a piece of magnetized metal for magnetic attachment to metal that is secured to a roof.

In an exemplary embodiment, the riser portion 52 of the mounting bracket 50 has a height, width, and thickness of two and half inches, two inches, and one eighth of an inch respectively. The riser portion 52 of the mounting bracket 50 in this embodiment has at least one aperture 54 that has an inside diameter of at least one quarter of an inch. In an exemplary embodiment, the mounting portion 56 of the mounting bracket 50 has a length, width, and thickness of three inches, two inches, and one eighth of an inch. The apertures 58a, 58b, 58c, 58d have an inside diameter of at least one eighth of an inch in this embodiment. It is understood by those skilled in the art that these measurements are not to be construed as limits on the claims and variations will be in accordance to the particular application in which the invention is used.

The cable holding device 20 (as shown in FIGS. 1-3) can be fabricated of materials that have good performance, strength, and outside aging characteristics. The framework 23 (as shown in FIGS. 2-5), the plate 32 (as shown in FIGS. 2-5), the arm 38 (as shown in FIGS. 1-3 & FIG. 6), and the mounting bracket 50 (as shown in FIGS. 1-3 & FIG. 7) can be made of materials, including but not limited to, galvanized steel, stainless steel, cold rolled steel, aluminum, brass, and plastic. The rods 26a, 26b, 26c, 26d (as shown in FIGS. 2-5) must be made of steel to achieve the greatest strength. If the rods 26a, 26b, 26c, 26d (as shown in FIGS. 2-5) are comprised of two or more pieces, the external casing 30 (as shown in FIG. 8 & FIG. 10) can be made of materials, including but not limited to, steel tubing stock, brass, plastic, nylon, composite, or any type of piping material. It is to be understood that the materials and methods of manufacture listed herein are exemplary and not to be construed as limiting the scope of the claims.

The cable holding device 20 (as shown in FIGS. 1-3) can be fabricated and mass produced in a machine shop, factory, or the like for a minimal cost per unit produced. The first step in making the cable holding device 20 (as shown in FIGS. 1-3) is to obtain or to create the necessary components to form the body 22 (as shown in FIGS. 1-5) including the structural plates 24a, 24b, 24c, 24d (as shown in FIGS. 2-5), the plate 32 (as shown in FIGS. 2-5), and the rods 26a, 26b, 26c, 26d (as shown in FIGS. 2-5). If needed, rod fastening lock nuts 28a, 28b, 28c, 28d (as shown in FIG. 2 and FIGS. 4-5) may be obtained. The upper adjusting lock nut 36 (as shown in FIG. 2) and lower adjusting lock nut 48 (as shown in FIG. 2) may also be obtained. Alternatively, the upper adjusting wing nut 37 (as shown in FIG. 3) and the lower adjusting wing nut 49 (as shown in FIG. 3) may be obtained.

If the framework 23 (as shown in FIGS. 2-5) and the plate 32 (as shown in FIGS. 2-5) are made of metal, each of the structural plates 24a, 24b, 24c, 24d (as shown in FIGS. 2-5) and the plate 32 (as shown in FIGS. 2-5) are made by cutting piece of metal to a predetermined length, width, and thickness. Apertures (not shown) are drilled into each of the structural plates 24a, 24b, 24c, 24d (as shown in FIGS. 2-5) at specified intervals and positioned to create optimal alignment of the apertures (not shown) of opposing structural plates 24a, 24b (as shown in FIGS. 2-5) and of opposing structural plates 24c, 24d (as shown in FIGS. 2-5). At least one aperture (not shown) is drilled into the plate 32 (as shown in FIGS. 2-5). Next, one end of the structural plate 24a (as shown in FIGS. 2-5) is welded to an end of the structural plate 24c (as shown in FIGS. 2-5) and the other end of the structural plate 24a (as shown in FIGS. 2-5) is welded to an end of the structural plate 24d (as shown in FIGS. 2-5). Similarly, one end of the structural plate 24b (as shown in FIGS. 2-5) is welded to an end of the structural plate 24c (as shown in FIGS. 2-5) and the other end of the structural plate 24b (as shown in FIGS. 2-5) is welded to an end of the structural plate 24d (as shown in FIGS. 2-5). The plate 32 (as shown in FIGS. 2-5) is then welded to one of the structural plates 24a, 24b, 24c, 24d (as shown in FIGS. 2-5). If made of plastic, the structural plates 24a, 24b, 24c, 24d (as shown in FIGS. 2-5) and the plate 32 (as shown in FIGS. 2-5) can be fabricated via plastic injection molding, stamped with a plurality of apertures, and connected in the appropriate configuration via fusion.

Next, the rods 26a, 26b, 26c, 26d (as shown in FIGS. 2-5) are obtained and are cut to a predetermined length, width, and thickness. The rods 26a, 26b, 26c, 26d (as shown in FIGS. 2-5) are then connected to the framework 23 (as shown in FIGS. 2-5) by any conventional means. In some embodiments, rod fastening lock nuts 28a, 28b, 28c, 28d (as shown in FIG. 2 & FIGS. 4-5) are used to secure the rods 26a, 26b, 26c, 26d (as shown in FIGS. 2-5) to the framework 23 (as shown in FIGS. 2-5).

Next, the arm 38 (as shown in FIGS. 1-3 & FIG. 6) is fabricated. If made of metal, the arm 38 (as shown in FIGS. 1-3 & FIG. 6) is made by cutting a piece of metal to a predetermined length, width, and thickness. The apertures 44a, 44b (as shown in FIG. 6) are drilled into the first end 40 (as shown in FIG. 6) and second end 42 (as shown in FIG. 6) of the arm 38 (as shown in FIGS. 1-3 & FIG. 6) respectively to complete the formation of the arm 38 (as shown in FIGS. 1-3 & FIG. 6). If made of plastic, the arm 38 (as shown in FIGS. 1-3 & FIG. 6) is fabricated through plastic injection molding and the apertures 44a, 44b (as shown in FIG. 6) are stamped into the first end 40 (as shown in FIG. 6) and second end 42 (as shown in FIG. 6) of the arm 38 (as shown in FIGS. 1-3 & FIG. 6) respectively.

Next, the mounting bracket 50 (as shown in FIGS. 1-3 & FIG. 7) is fabricated. If the mounting bracket 50 (as shown in FIGS. 1-3 & FIG. 7) is made of metal, the riser portion 52 (as shown in FIGS. 2-3 & FIG. 7) and the mounting portion 56 (as shown in FIGS. 2-3 & FIG. 7) are made by cutting pieces of metal to a predetermined length, width, and thickness. At least one aperture 54 (as shown in FIG. 7) is drilled into the riser portion 52 (as shown in FIGS. 2-3 & FIG. 7) of the mounting bracket 50 (as shown in FIGS. 1-3 & FIG. 7). Similarly, the apertures 58a, 58b, 58c, 58d (as shown in FIG. 7) are drilled into the mounting portion 56 (as shown in FIGS. 2-3 & FIG. 7) of the mounting bracket 50 (as shown in FIGS. 1-3 & FIG. 7). Next, the riser portion 52 (as shown in FIGS. 2-3 & FIG. 7) and the mounting portion 56 (as shown in FIGS. 2-3 & FIG. 7) are welded together to complete the formation of the mounting bracket 50 (as shown in FIGS. 1-3 & FIG. 7). If made of plastic, the riser portion 52 (as shown in FIGS. 2-3 & FIG. 7) and the mounting portion 56 (as shown in FIGS. 2-3 & FIG. 7) of the mounting bracket 50 (as shown in FIGS. 1-3 & FIG. 7) are formed via plastic injection molding and fused together after apertures are stamped into each portion.

After formation of the body 22 (as shown in FIGS. 1-5), the arm 38 (as shown in FIGS. 1-3 & FIG. 6), and the mounting bracket 50 (as shown in FIGS. 1-3 & FIG. 7), the plate 32 (as shown in FIGS. 2-5) of the body 22 (as shown in FIGS. 1-5) is connected to the arm 38 (as shown in FIGS. 1-3 & FIG. 6). In an exemplary embodiment of the cable holding device 20 as shown in FIG. 2, the plate 32 (as shown in FIGS. 2-5) is connected to the arm 38 (as shown in FIGS. 1-3 & FIG. 6) using at least one upper adjusting bolt 34 (as shown in FIG. 2) and at least one upper adjusting lock nut 36 (as shown in FIG. 2). The upper adjusting bolt 34 (as shown in FIG. 2) passes through at least one aperture 44a (as shown in FIG. 6) of the arm 38 (as shown in FIGS. 1-3 & FIG. 6) and through an aperture (not shown) of the plate 32 (as shown in FIGS. 2-5) of the body 22 (as shown in FIGS. 1-5). The upper adjusting lock nut 36 (as shown in FIG. 2) secures the upper adjusting bolt 34 (as shown in FIG. 2) and allows for a pivotal connection between the body 22 (as shown in FIGS. 1-5) and the arm 38 (as shown in FIGS. 1-3 & FIG. 6).

In an alternative embodiment of the cable holding device 20 as shown in FIG. 3, the upper adjusting bolt 34 (as shown in FIG. 3) is tack welded to the plate 32 (as shown in FIGS. 2-5) and passes through at least one aperture 44a (as shown in FIG. 6) of the arm 38 (as shown in FIGS. 1-3 & FIG. 6). The upper adjusting wing nut 37 secures the upper adjusting bolt 34 in this embodiment and allows for a pivotal connection between the body 22 (as shown in FIGS. 1-5) and the arm 38 (as shown in FIGS. 1-3 & FIG. 6).

Next, the arm 38 (as shown in FIGS. 1-3 & FIG. 6) is connected to the riser portion 52 (as shown in FIGS. 2-3 & FIG. 7) of the mounting bracket 50 (as shown in FIGS. 1-3 & FIG. 7). In an exemplary embodiment of cable holding device 20 as shown in FIG. 2, the arm 38 (as shown in FIGS. 1-3 & FIG. 6) is connected to the riser portion 52 (as shown in FIGS. 2-3 & FIG. 7) of the mounting bracket 50 (as shown in FIGS. 1-3 & FIG. 7) by using at least one lower adjusting bolt 46 (as shown in FIG. 2) and at least one lower adjusting lock nut 48 (as shown in FIG. 2). The lower adjusting bolt 46 (as shown in FIG. 2) passes through at least one aperture 44b (as shown in FIG. 6) of the arm 38 (as shown in FIGS. 1-3 & FIG. 6) and through at least one aperture 54 (as shown in FIG. 7) of the riser portion 52 (as shown in FIGS. 2-3 & FIG. 7) of the mounting bracket 50 (as shown in FIGS. 1-3 & FIG. 7). The lower adjusting lock nut 48 (as shown in FIG. 2) secures the lower adjusting bolt 46 (as shown in FIG. 2) and allows for the pivotal attachment of the arm 38 (as shown in FIGS. 1-3 & FIG. 6) to the mounting bracket 50 (as shown in FIGS. 1-3 & FIG. 7).

In an alternative embodiment as shown in FIG. 3, the lower adjusting bolt 46 is tack welded to the riser portion 52 (as shown in FIGS. 2-3 & FIG. 7) of the mounting bracket 50 (as shown in FIGS. 1-3 & FIG. 7) and passes through at least one aperture 44b (as shown in FIG. 6) of the arm 38 (as shown in FIGS. 1-3 & FIG. 6). The lower adjusting wing nut 49 secures the lower adjusting bolt 46 in this embodiment and allows for a pivotal connection between the arm 38 (as shown in FIGS. 1-3 & FIG. 6) and the mounting bracket 50 (as shown in FIGS. 1-3 & FIG. 7).

Next, fastening devices are used to install the cable holding device 20 (as shown in FIGS. 1-3) on metal roofs, non-metal roofs, eaves, stud walls, concrete walls, and similar structures. Fastening devices including, but not limited to, mounting bolts and self tapping screws are driven, screwed, or otherwise forced through the apertures 58a, 58b, 58c, 58d (as shown in FIG. 7) of the mounting portion 56 (as shown in FIGS. 2-3 & FIG. 7) of the mounting bracket 50 (as shown in FIGS. 1-3 & FIG. 7) to attach the assembled cable holding device 20 (as shown in FIGS. 1-3) to a desired surface. Once the mounting bracket 50 (as shown in FIGS. 1-3 & FIG. 7) is secured to a roof, eave, stud wall, concrete wall, or similar structure, the cable holding device 20 (as shown in FIGS. 1-3) is capable of holding, guiding, and stabilizing cables that pass through the body 22 (as shown in FIGS. 1-5) in any direction.

It is anticipated that individual features of the cable holding device 20 (as shown in FIGS. 1-3) can be changed, however, with substantially no effect on the overriding functionality and operative elements. The cable holding device 20 (as shown in FIGS. 1-3) can be modified to adapt to different needs, with substantially no effect on the overriding functionality and operative elements. It is understood by those skilled in the art, that the measurements provided in this application are not to be construed as limits on the claims and variations will be in accordance to the particular application in which the invention is used.

It is to be understood that the foregoing description and specific embodiments are merely illustrative of the best mode of the invention and the principles thereof and that various modifications and additions may be made to the apparatus by those skilled in the art, without departing from the spirit and scope of this invention, which is therefore understood to be limited only by the scope of the appended claims.

I claim:

1. A cable holding device, capable of being attached to a roof comprising:
    a body for holding at least one cable, said body being comprised of a framework, a plurality of rods attached to said framework and that rotate relative to said framework, and a plate attached to said framework,
    a mounting bracket attached to a terminal edge of a roof, said mounting bracket further comprising a riser portion having at least one aperture and that is disposed in a first plane and a mounting portion connected to said riser portion, said mounting portion having a plurality of apertures and being disposed in a second plane that is not parallel to said first plane, and
    an arm having first and second ends to which said body and said mounting bracket are respectively attached, said arm cooperating with said mounting bracket to extend said body a suitable distance beyond said terminal edge of said roof to allow at least one cable held within said body to drape over said terminal edge of said roof without touching said terminal edge of said roof.

2. The device of claim 1, wherein said plurality of rods further comprises:
    two or more rods that are in parallel and that are disposed in a first plane, and
    at least one rod that is disposed in a second plane that is not parallel to said first plane, thereby allowing at least one cable to be secured by said at least one rod in said second plane without interference from said two or more rods in said first plane.

3. The device of claim 2, wherein said two or more rods disposed in said first plane and said at least one rod disposed in said second plane, communicate with said framework to releasably secure at least one cable in a fixed position via static friction and communicate to release said at least one cable when said at least one cable is pulled.

4. The device of claim 1, wherein said mounting bracket is magnetic for magnetic attachment to metal that is secured to said roof.

5. The device of claim 1, wherein said mounting bracket is attached to a piece of magnetized metal for magnetic attachment to metal that is secured to said roof.

6. A method of holding at least one cable over a terminal edge of a roof without allowing said at least one cable to touch said terminal edge of said root comprising the steps of:
    obtaining a body for holding said cables, said body being comprised of a framework, a plurality of rods attached to said framework and that rotate relative to said framework, and a plate attached to said framework,
    obtaining a mounting bracket, said mounting bracket comprising a riser portion having at least one aperture and that is disposed in a first plane and a mounting portion connected to said riser portion, said mounting portion having a plurality of apertures and being disposed in a second plane that is not parallel to said first plane,
    obtaining an arm, having a first end and a second end, said first and second ends having at least one aperture,
    attaching said first end of said arm to said plate of said body, attaching said second end of said arm to said riser portion of said mounting bracket,
attaching said mounting portion of said mounting bracket to said roof,
extending said body a suitable distance beyond said terminal edge of said roof, and
releasably securing said at least one cable in a fixed position within said body via static friction, said at least one cable being released when said at least one cable is pulled.

* * * * *